United States Patent
Isakov

(10) Patent No.: US 6,836,697 B2
(45) Date of Patent: Dec. 28, 2004

(54) METHOD OF DETERMINING CUTTING FORCES, AND A CALCULATOR OPERATING IN ACCORDANCE WITH THE METHOD

(76) Inventor: Edmund Isakov, 11853 Grove Ridge Ln., Boynton Beach, FL (US) 33437

( * ) Notice: Subject to any disclaimer, the term of this patent is extended or adjusted under 35 U.S.C. 154(b) by 0 days.

(21) Appl. No.: 10/331,308

(22) Filed: Dec. 31, 2002

(65) Prior Publication Data

US 2004/0128017 A1 Jul. 1, 2004

(51) Int. Cl.$^7$ .............................................. G06F 19/00
(52) U.S. Cl. ....................... 700/159; 700/172; 700/173; 409/131; 409/136
(58) Field of Search ................................. 700/159, 172, 700/173; 409/131, 135, 136; 80/1.11

(56) References Cited

U.S. PATENT DOCUMENTS 4,584,649 A * 4/1986 Komanduri et al. ........ 700/173

* cited by examiner

*Primary Examiner*—Leo Picard
*Assistant Examiner*—Charles Kasenge
(74) *Attorney, Agent, or Firm*—I. Zborovsky

(57) ABSTRACT

A method of determining feed and radial forces has the steps of subdividing work materials into seven groups which are different from one another by Brinell hardness, for each group separately determining a feed force and radial force based on a tangential force in accordance with individual formula which is different from formulas for other groups, and also separately for a turning process and for a boring process. Also, a calculator is proposed which utilizes the inventive method.

12 Claims, No Drawings

METHOD OF DETERMINING CUTTING FORCES, AND A CALCULATOR OPERATING IN ACCORDANCE WITH THE METHOD

BACKGROUND OF THE INVENTION

The present invention relates to a method of determining cutting forces, and also to a calculator which utilizes the new method.

Turning and boring operations become productive when machining conditions such as cutting speed, feed per revolution, and depth of cut are properly selected according to the cutting tool material and geometry, mechanical properties of the workpiece material, and technical characteristics of the machine tool. Besides that, ability to determine cutting forces allows for setting maximum productivity within machine tool power capacity and prevents stalling the machine tool. The cutting forces are: tangential, feed, and radial. Tangential force $F_t$ is determined by the formula, which is used when turning and boring as disclosed in E. Isakov "Reassessing power factors", American Machinists, December 1996, pages 43–45.

$$F_t = 396000 dfp \text{ (lbf)}$$

where d=depth of cut, in., f=feed rate, in/rev.

p=specific power, hp/in.$^3$/min, and 396000 is a conversion factor.

Determined tangential force $F_t$ and selected cutting speed $V_c$ allow for determination of the required machining power P:

$$P = F_t V_c / 33000 \text{(hp)}$$

where 33000 is a conversion factor.

Feed $F_f$ and radial $F_r$ forces are proportional to tangential force $F_t$. It is a common practice to consider that $F_f = 0.5 F_t$ and $F_r = 0.25 F_t$. Unfortunately, this method of feed and radial force determination has acceptable accuracy only when applied to some carbon steels in annealed and normalized conditions.

Another known method as disclosed in E. Isakov "Reassessing power factors", American Machinists, December 1996, pages 43–45 provides more accurate formulas for determination of feed $F_f$ and radial $F_r$ forces at the following cutting conditions.

$F_f = 0.581 F_t - 18.3$: AISI 1018 and 316 steels, 140–200 HB, 0.008–0.01 ipr feed, 0.06–0.3 in. depth of cut
$F_f = 0.458 F_t - 6.6$: AISI 1045 and 4140 steels, 140–200 HB, 0.012–0.02 ipr feed, 0.06–0.3 in. depth of cut $F_f = 0.556 F_t - 5.3$: AISI 4340 and H11 steels, 205–260 HB, 0.008–0.012 ipr feed, 0.06–0.3 in. depth of cut $F_f = 0.477 F_t + 7.3$: AISI 4140 and 410 steels, 205–260 HB, 0.015–0.02 ipr feed, 0.06–0.3 in. depth of cut
$F_r = 0.145 F_t + 32.0$: AISI 1018 and 316 steels, 140–200 HB, 0.01–0.02 ipr feed, 0.06–0.15 in. depth of cut
$F_r = 0.182 F_t - 9.3$: AISI 1045 and 4140 steels, 140–200 HB, 0.01–0.02 ipr feed, 0.18–0.3 in. depth of cut
$F_r = 0.111 F_t + 40.7$: AISI 4340 and H11 steels, 205–260 HB, 0.008–0.012 ipr feed, 0.06–0.3 in. depth of cut
$F_r = 0.143 F_t + 48.7$: AISI 4140 and 410 steels, 205–260 HB, 0.015–0.02 ipr feed, 0.06–0.3 in. depth of cut.

These formulas are utilized in the electronic "Metalcutting Force and Power Calculator: Turning and Boring" E. Isakov "Metalcutting Force and Power Calculator" (Turning, Boring, Milling)" on the 3.5 inch diskette.kennametal, Inc. 1998.

Limitations of these formulas are as follows:

Applied only to a few grades of carbon (1018 and 1045), alloy (4140 and 4340), stainless (316 and 410), and tool (H11) steels having Brinell hardness numbers from 140 to 260 HB.

If hardness of the above-mentioned work materials is indicated in other then Brinell hardness numbers, the equivalent hardness numbers should be found in the appropriate handbooks.

Applied to the feed rates from 0.008 in./rev. to 0.020 in./rev.

Applied to the depth of cuts from 0.060 in. to 0.300 in.

SUMMARY OF THE INVENTION

Accordingly, it is an object of the present invention to provide a method of determining cutting forces, and a calculator which uses the method, which avoids the disadvantages of the prior art.

In keeping with these objects and with others which will become apparent hereinafter, one feature of the present invention resides in a method of determining cutting forces in accordance with which the work materials are divided into special new groups which differ from one another by Brinell hardness, and feed and radial forces are determined from a tangential force differently for the material of each group and also differently for a turning process and for a boring process.

In accordance with another feature of the present invention a calculator is provided in which the determination of feed and radial forces is performed in accordance with the above specified inventive method.

The novel features which are considered as characteristic for the present invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

In accordance with the present invention a method of determining cutting of forces is proposed. In the new method first of all work materials are divided into seven groups as follows:

Group 1: Carbon, alloy, stainless, and tool steels, Brinell hardness from 120 to 280.
Group 2: Carbon, alloy, stainless, and tool steels, Brinell hardness from 300 to 500.
Group 3: Gray cast irons, Brinell hardness from 150 to 200.
Group 4: Ductile cast irons, Brinell hardness from 150 to 200.
Group 5: Titanium alloys, Brinell hardness from 275 to 300.
Group 6: Nickel-base alloys, Brinell hardness from 260 to 350.
Group 7: Aluminum alloys, Brinell hardness from 100 to 150.

Based on the above specified groups, for the materials in each group the feed and radial forces are determined separately and individually for each group. The determination of feed and radial forces for a turning process is performed as presented in Table 1.

TABLE 1

| Group of Work Materials | Feed Force Formula | Radial Force Formula |
| --- | --- | --- |
| Group 1 | $F_f = 0.460\ F_t$ | $F_r = 0.221\ F_t$ |
| Group 2 | $F_f = 0.683\ F_t$ | $F_r = 0.382\ F_t$ |
| Group 3 | $F_f = 0.486\ F_t$ | $F_r = 0.269\ F_t$ |
| Group 4 | $F_f = 0.532\ F_t$ | $F_r = 0.242\ F_t$ |
| Group 5 | $F_f = 0.675\ F_t$ | $F_r = 0.411\ F_t$ |
| Group 6 | $F_f = 0.609\ F_t$ | $F_r = 0.373\ F_t$ |
| Group 7 | $F_f = 0.429\ F_t$ | $F_r = 0.211\ F_t$ |

In accordance with the present invention for determining feed and radial forces for a boring process the method in accordance with the following table is utilized.

TABLE 2

| Group of Work Materials | Feed Force Formula | Radial Force Formula |
| --- | --- | --- |
| Group 1 | $F_f = 0.537\ F_t$ | $F_r = 0.308\ F_t$ |
| Group 2 | $F_f = 0.869\ F_t$ | $F_r = 0.672\ F_t$ |
| Group 3 | $F_f = 0.579\ F_t$ | $F_r = 0.422\ F_t$ |
| Group 4 | $F_f = 0.596\ F_t$ | $F_r = 0.331\ F_t$ |
| Group 5 | $F_f = 0.725\ F_t$ | $F_r = 0.592\ F_t$ |
| Group 6 | $F_f = 0.658\ F_t$ | $F_r = 0.510\ F_t$ |
| Group 7 | $F_f = 0.486\ F_t$ | $F_r = 0.311\ F_t$ |

In many situations hardness of work materials is available in different hardness determination systems. In accordance with the present invention if hardness of work material is available in Rockwell B numbers, conversion is performed into Brinell hardness numbers and is performed in accordance with the present invention as presented in the following table:

TABLE 3

| Rockwell B Hardness Numbers (HRB) | | Equations to Convert Rockwell B Hardness (HRB) into Brinell Hardness (HB) |
| --- | --- | --- |
| From | To | |
| 41 | 64.9 | HB = 1.117 HRB + 33.4 |
| 65 | 75.9 | HB = 2.279 HRB − 38.1 |
| 76 | 80.9 | HB = 2.727 HRB − 71.3 |
| 81 | 85.9 | HB = 3.364 HRB − 123.1 |
| 86 | 90.9 | HB = 4.120 HRB − 187.9 |
| 91 | 95.9 | HB = 5.431 HRB − 307.0 |
| 96 | 100.0 | HB = 6.754 HRB − 434.2 |

When the hardness of work material is available in Rockwell C. Numbers, conversion into Brinell hardness numbers is performed as presented herein below in the following table:

TABLE 4

| Rockwell C Hardness Numbers (HRC) | | Equations to Convert Rockwell C Hardness (HRC) into Brinell Hardness (HB) |
| --- | --- | --- |
| From | To | |
| 20 | 25.9 | HB = 5.328 HRC + 119.6 |
| 26 | 30.9 | HB = 7.077 HRC + 73.5 |
| 31 | 35.9 | HB = 8.356 HRC + 34.5 |
| 36 | 40.9 | HB = 8.938 HRC + 13.6 |
| 41 | 45.9 | HB = 10.264 HRC − 41.1 |
| 46 | 50.9 | HB = 12.610 HRC − 149.3 |
| 51 | 55.9 | HB = 15.829 HRC − 311.9 |

TABLE 4-continued

| Rockwell C Hardness Numbers (HRC) | | Equations to Convert Rockwell C Hardness (HRC) into Brinell Hardness (HB) |
| --- | --- | --- |
| From | To | |
| 56 | 60.9 | HB = 19.213 HRC − 499.7 |
| 61 | 65.3 | HB = 17.323 HRC − 386.5 |

In a calculator the above described method is utilized. The calculator includes software means for subdividing the work materials into seven groups, software means for determining the feed and radial forces for a turning process as specified in Table 1, software means for determining feed and radial forces for a boring process as specified in Table 2, software means for conversion of Rockwell B. hardness numbers into Brinell hardness numbers as specified in Table 3, and software means for converting Rockwell C hardness numbers into Brinell hardness numbers as specified in Table 4.

It will be understood that each of the elements described above, or two or more together, may also find a useful application in other types of constructions differing from the types described above.

While the invention has been illustrated and described as embodied in method of determining cutting forces, and a calculator operating in accordance with the method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of determining feed and radial forces, comprising the steps of subdividing work materials into seven groups which are different from one another by Brinell hardness; for each group separately determining a feed force and a radical force based on a tangential force in accordance with individual formula which is different from formulas for other groups, and also separately for a turning process and for a boring process.

2. A method of determining feed and radial forces, comprising the steps of subdividing work materials into seven groups which are different from one another by Brinell hardness; for each group separately determining a feed force and a radial force based on a tangential force in accordance with individual formula which is different from formulas for other groups, and also separately for a turning process and for a boring process, wherein the subdividing includes a subdividing the work materials into the following groups:

Group 1: Carbon, alloy, stainless, and tool steels, Brinell hardness from 120 to 280;

Group 2: Carbon, alloy, stainless, and toot steels, Brinell hardness from 300 to 500;

Group 3: Gray cast irons, Brinell hardness from 150 to 200;

Group 4: Ductile cast irons, Brinell hardness from 150 to 200;

Group 5: Titanium alloys, Brinell hardness from 275 to 300;

Group 6: Nickel-base alloys, Brinell hardness from 260 to 350;

Group 7: Aluminum alloys, Brinell hardness from 100 to 150.

3. A method of determining feed and radial forces, comprising the steps of subdividing work materials into seven groups which are different from one another by Brinell hardness; for each group separately determining a feed force and a radial force based on a tangential force in accordance with individual formula which is different from formulas for other groups, and also separately for a turning process and for a boring process 1, wherein said determining feed and radial forces for a turning process includes determining in accordance with the following formulas:

| Group of Work Materials | Feed Force Formula | Radial Force Formula |
| --- | --- | --- |
| Group 1 | $F_f = 0.460\ F_t$ | $F_r = 0.221\ F_t$ |
| Group 2 | $F_f = 0.683\ F_t$ | $F_r = 0.382\ F_t$ |
| Group 3 | $F_f = 0.486\ F_t$ | $F_r = 0.269\ F_t$ |
| Group 4 | $F_f = 0.532\ F_t$ | $F_r = 0.242\ F_t$ |
| Group 5 | $F_f = 0.675\ F_t$ | $F_r = 0.411\ F_t$ |
| Group 6 | $F_f = 0.609\ F_t$ | $F_r = 0.373\ F_t$ |
| Group 7 | $F_f = 0.429\ F_t$ | $F_r = 0.211\ F_t$ |

4. A method of determining feed and radial forces, comprising the steps of subdividing work materials into seven groups which are different from one another by Brinell hardness; for each group separately determining a feed force and a radial force based on a tangential force in accordance with individual formula which is different from formulas for other groups, and also separately for a turning process and for a boring process, wherein said determining of feed and radial forces for a boring process includes determining in accordance with the following formulas:

| Group of Work Materials | Feed Force Formula | Radial Force Formula |
| --- | --- | --- |
| Group 1 | $F_f = 0.537\ F_t$ | $F_r = 0.308\ F_t$ |
| Group 2 | $F_f = 0.869\ F_t$ | $F_r = 0.672\ F_t$ |
| Group 3 | $F_f = 0.579\ F_t$ | $F_r = 0.422\ F_t$ |
| Group 4 | $F_f = 0.596\ F_t$ | $F_r = 0.331\ F_t$ |
| Group 5 | $F_f = 0.725\ F_t$ | $F_r = 0.592\ F_t$ |
| Group 6 | $F_f = 0.658\ F_t$ | $F_r = 0.510\ F_t$ |
| Group 7 | $F_f = 0.486\ F_t$ | $F_r = 0.311\ F_t$ |

5. A method of determining feed and radial forces, comprising the steps of subdividing work materials into seven groups which are different from one another by Brinell hardness; for each group separately determining a feed force and a radial force based on a tangential force in accordance with individual formula which is different from formulas for other groups, and also separately for a turning process and for a boring process; and further comprising converting Rockwell B. hardness numbers into Brinell hardness numbers as follows:

| Rockwell B Hardness Numbers (HRB) | | Equations to Convert Rockwell B Hardness (HRB) into Brinell Hardness (HB) |
| --- | --- | --- |
| From | To | |
| 41 | 64.9 | HB = 1.117 HRB + 33.4 |
| 65 | 75.9 | HB = 2.279 HRB − 38.1 |
| 76 | 80.9 | HB = 2.727 HRB − 71.3 |
| 81 | 85.9 | HB = 3.364 HRB − 123.1 |
| 86 | 90.9 | HB = 4.120 HRB − 187.9 |
| 91 | 95.9 | HB = 5.431 HRB − 307.0 |
| 96 | 100.0 | HB = 6.754 HRB − 434.2. |

6. A method of determining feed and radial forces, comprising the steps of subdividing work materials into seven groups which are different from one another by Brinell hardness; for each group separately determining a feed force and a radial force based on a tangential force in accordance with individual formula which is different from formulas for other groups, and also separately for a turning process and for a boring process; and further comprising converting Rockwell C numbers into Brinell hardness numbers as follows:

| Rockwell C Hardness Numbers (HRC) | | Equations to Convert Rockwell C Hardness (HRC) into Brinell Hardness (HB) |
| --- | --- | --- |
| From | To | |
| 20 | 25.9 | HB = 5.328 HRC + 119.6 |
| 26 | 30.9 | HB = 7.077 HRC + 73.5 |
| 31 | 35.9 | HB = 8.356 HRC + 34.5 |
| 36 | 40.9 | HB = 8.938 HRC + 13.6 |
| 41 | 45.9 | HB = 10.264 HRC − 41.1 |
| 46 | 50.9 | HB = 12.610 HRC − 149.3 |
| 51 | 55.9 | HB = 15.829 HRC − 311.9 |
| 56 | 60.9 | HB = 19.213 HRC − 499.7 |
| 61 | 65.3 | HB = 17.323 HRC − 386.5. |

7. A calculator for determining feed and radial forces, comprising software means for subdividing work materials into seven groups; and software means for determining for each group of work materials a feed force and a radial force in accordance with individual formula which is different from formulas of other groups, and separately for a turning process and for a boring process.

8. A calculator for determining feed and radial forces, comprising software means for subdividing work materials into seven groups; and software means for determining for each group of work materials a feed force and a radial force in accordance with individual formula which is different from formulas of other groups, and separately for a turning process and for a boring process, wherein said software means for subdividing the work materials is formed to subdivide the work materials as follows:

Group 1; Carbon, alloy, stainless, and tool steels, Brinell hardness from 120 to 280;

Group 2: Carbon, alloy, stainless, and tool steels, Brinell hardness from 300 to 500;

Group 3: Gray cast irons, Brinell hardness from 150 to 200;

Group 4: Ductile cast irons, Brinell hardness from 150 to 200;

Group 5: Titanium alloys, Brinell hardness from 275 to 300;

Group 6: Nickel-base alloys, Brinell hardness from 260 to 350;

Group 7: Aluminum alloys, Brinell hardness from 100 to 150.

9. A calculator for determining feed and radial forces, comprising software means for subdividing work materials into seven groups; and software means for determining for each group of work materials a feed force and a radial force in accordance with individual formula which is different from formulas of other groups, and separately for a turning process and for a boring process, wherein said determining software means is formed determine feed and radial forces for a turning process as follows:

| Group of Work Materials | Feed Force Formula | Radial Force Formula |
|---|---|---|
| Group 1 | $F_f = 0.460\ F_t$ | $F_r = 0.221\ F_t$ |
| Group 2 | $F_f = 0.683\ F_t$ | $F_r = 0.382\ F_t$ |
| Group 3 | $F_f = 0.486\ F_t$ | $F_r = 0.269\ F_t$ |
| Group 4 | $F_f = 0.532\ F_t$ | $F_r = 0.242\ F_t$ |
| Group 5 | $F_f = 0.675\ F_t$ | $F_r = 0.411\ F_t$ |
| Group 6 | $F_f = 0.609\ F_t$ | $F_r = 0.373\ F_t$ |
| Group 7 | $F_f = 0.429\ F_t$ | $F_r = 0.211\ F_t$ |

10. A calculator for determining feed and radial forces, comprising software means for subdividing work materials into seven groups; and software means for determining for each group of work materials a feed force and a radial force in accordance with individual formula which is different from formulas of other groups, and separately for a turning process and for a boring process, wherein said determining software means is formed determine feed and radial forces for a turning process as follows:

| Group of Work Materials | Feed Force Formula | Radial Force Formula |
|---|---|---|
| Group 1 | $F_f = 0.537\ F_t$ | $F_r = 0.308\ F_t$ |
| Group 2 | $F_f = 0.869\ F_t$ | $F_r = 0.672\ F_t$ |
| Group 3 | $F_f = 0.579\ F_t$ | $F_r = 0.422\ F_t$ |
| Group 4 | $F_f = 0.596\ F_t$ | $F_r = 0.331\ F_t$ |
| Group 5 | $F_f = 0.725\ F_t$ | $F_r = 0.592\ F_t$ |
| Group 6 | $F_f = 0.658\ F_t$ | $F_r = 0.510\ F_t$ |
| Group 7 | $F_f = 0.486\ F_t$ | $F_r = 0.311\ F_t$ |

11. A calculator for determining feed and radial forces, comprising software means for subdividing work materials into seven groups; and software means for determining for each group of work materials a feed force and a radial force in accordance with individual formula which is different from formulas of other groups, and separately for a turning process and for a boring process; and further comprising software means for converting Rockwell B. hardness numbers into Brinell hardness numbers as follows:

| Rockwell B Hardness Numbers (HRB) | | Equations to Convert Rockwell B Hardness (HRB) into Brinell |
|---|---|---|
| From | To | Hardness (HB) |
| 41 | 64.9 | HB = 1.117 HRB + 33.4 |
| 65 | 75.9 | HB = 2.279 HRB − 38.1 |
| 76 | 80.9 | HB = 2.727 HRB − 71.3 |
| 81 | 85.9 | HB = 3.364 HRB − 123.1 |
| 86 | 90.9 | HB = 4.120 HRB − 187.9 |
| 91 | 95.9 | HB = 5.431 HRB − 307.0 |
| 96 | 100.0 | HB = 6.754 HRB − 434.2 |

12. A calculator for determining feed and radial forces, comprising software means for subdividing work materials into seven groups; and software means for determining for each group of work materials a feed force and a radial force in accordance with individual formula which is different from formulas of other groups, and separately for a turning process and for a boring process; and further comprising software means for converting Rockwell C hardness numbers into Brinell hardness numbers as follows:

| Rockwell C Hardness Numbers (HRC) | | Equations to Convert Rockwell C Hardness (HRC) into Brinell |
|---|---|---|
| From | To | Hardness (HB) |
| 20 | 25.9 | HB = 5.328 HRC + 119.6 |
| 26 | 30.9 | HB = 7.077 HRC + 73.5 |
| 31 | 35.9 | HB = 8.356 HRC + 34.5 |
| 36 | 40.9 | HB = 8.938 HRC + 13.6 |
| 41 | 45.9 | HB = 10.264 HRC − 41.1 |
| 46 | 50.9 | HB = 12.610 HRC − 149.3 |
| 51 | 55.9 | HB = 15.829 HRC − 311.9 |
| 56 | 60.9 | HB = 19.213 HRC − 499.7 |
| 61 | 65.3 | HB = 17.323 HRC − 386.5 |

\* \* \* \* \*